July 12, 1960
R. A. SANDBERG
2,944,339
METHOD OF BRAZING REFRIGERATOR EVAPORATORS
Filed Dec. 3, 1953
2 Sheets-Sheet 2
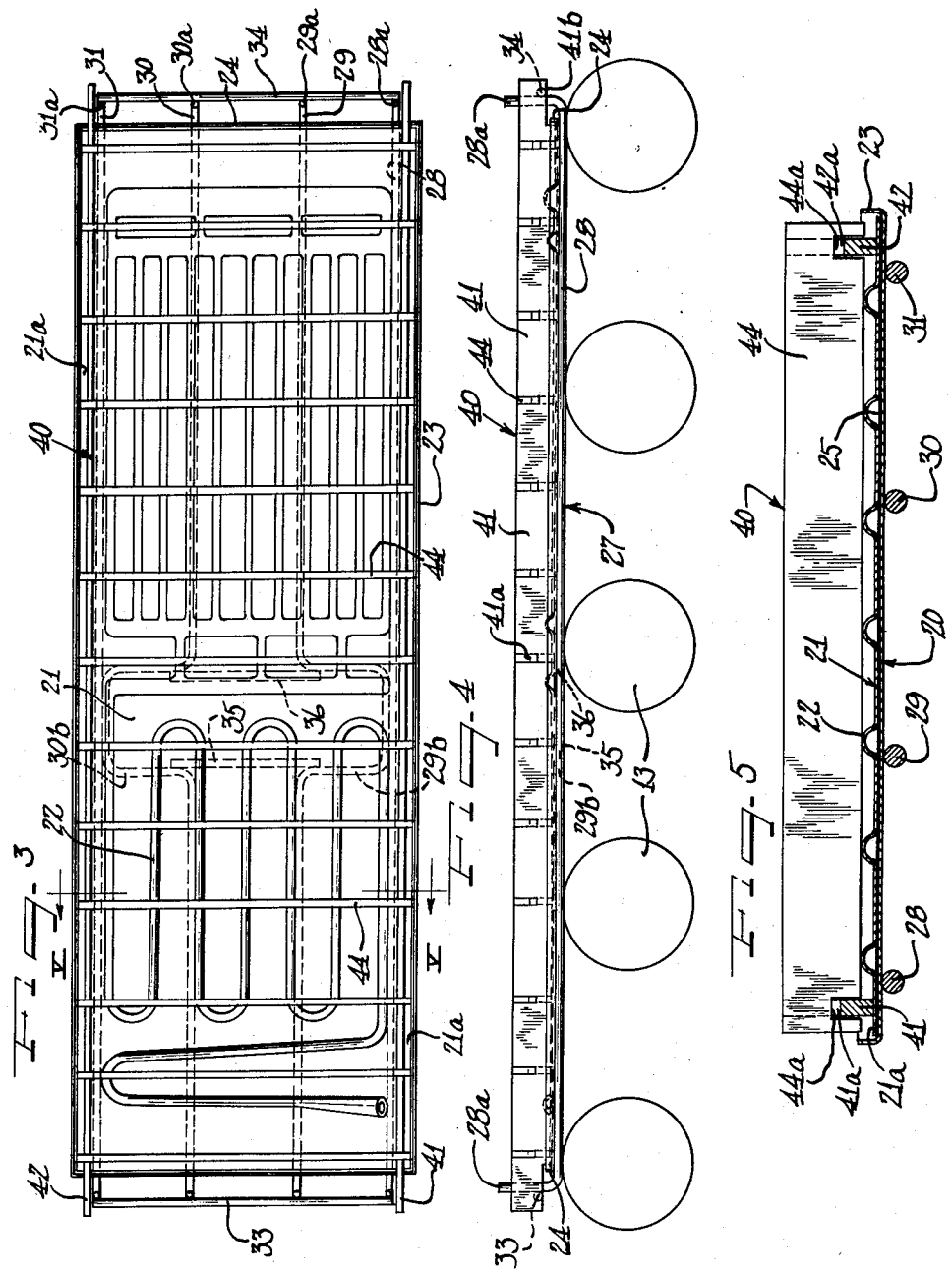
Inventor
Ray A. Sandberg United States Patent Office 2,944,339
Patented July 12, 1960

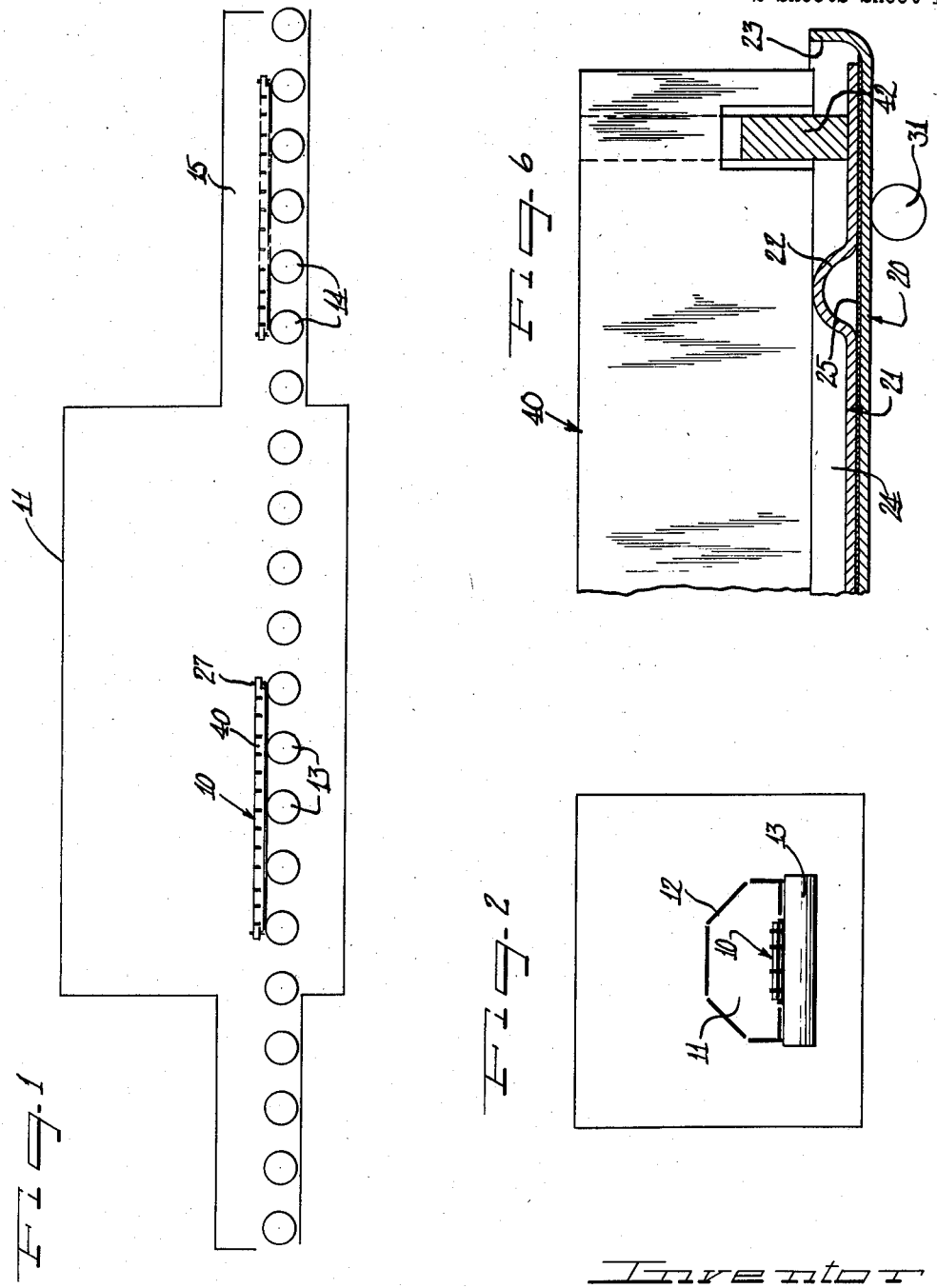

2,944,339

METHOD OF BRAZING REFRIGERATOR EVAPORATORS

Ray A. Sandberg, Waukegan, Ill., assignor to Houdaille Industries, Inc., a corporation of Michigan Filed Dec. 3, 1953, Ser. No. 395,895

2 Claims. (Cl. 29—493)

This invention relates to a method of and apparatus for brazing, and particularly to such a method and apparatus for brazing superimposed sheets to form refrigerator evaporators.

It is an object of the present invention to provide a novel method and apparatus for brazing which affords an increased production rate.

It is a further object of the present invention to provide a novel brazing method and apparatus by which sheets to be brazed are urged together during heating to promote uniform and complete brazing of the sheets.

It is another object of the present invention to provide a novel bottom support rack for superimposed sheets to be brazed.

It is still another object of the present invention to provide a novel upper rack assembly for exerting a downward force on the upper of superimposed sheets to be brazed.

It is yet another object of the present invention to provide a novel brazing mixture assembly accommodating more efficient heating of the work associated therewith.

It is a still further object of the present invention to provide a novel brazing fixture for coacting with the inner and outer shells of a refrigerator evaporator to be brazed.

It is a more specific object to reduce total weight substantially of the work and the fixture combination without impairing the ability to produce a successful braze.

It is still a further specific object to reduce the weight ratio of fixture to work being brazed without resulting in excessive rejects on a production basis.

It is still another specific object to increase the rate of heating of work to temperatures in excess of 2000 degrees F., and at the same time obtain a uniform pattern of heat for a successful braze.

It is still a further specific object to remove a substantial amount of weight in the work shielded lower support rack to increase the rate of heating of the work itself.

It is still a further specific object to minimize the chilling effect of the lower rack due to mass, which results in a faster rate of heating of the entire assembly to a uniform temperature.

It is still a further specific object to reduce the weight in the lower rack assembly, since heating elements in the furnace cannot be placed on the under side of the rack, due to furnace construction not permitting same.

It is still a further specific object to reduce the cost of the brazing fixture which employs high nickel chrome alloys due to temperatures in excess of 2000 degrees F.

Other objects, features and advantages of the invention will be readily apparent from the following detailed description of a preferred embodiment thereof taken in conjunction with the accompanying sheets of drawings, in which:

Figure 1 is a diagrammatic elevational view illustrating the manner in which the work is transported through the heating and cooling chambers during the brazing operation;

Figure 2 is a diagrammatic vertical sectional view showing the work in the heating chamber;

Figure 3 is a plan view of the work in assembly with the brazing fixture;

Figure 4 is a side elevational view illustrating the work and fixture traveling on the rolls utilized in the present invention;

Figure 5 is a transverse sectional view taken substantially along the line V—V of Figure 3; and Figure 6 is an enlarged fragmentary vertical sectional view of a portion of Figure 5.

The present apparatus and method are particularly adapted to brazing refrigerator evaporator shells and have been illustrated in this embodiment. As indicated in Figure 1, after the inner and outer shells have been superimposed with the brazing material therebetween, and placed in assembly with a brazing mixture indicated at 10 in Figures 1 and 2, the assembly is transported through a heating chamber 11 having heating elements 12, Figure 2, by means of spaced rollers 13. Subsequent to the heating operation, the work and fixture assembly is transported as by similar rollers 14 through a cooling chamber 15 which is water cooled, the entire cooling chamber 15 being surrounded with a water jacket (not shown).

The refrigerator evaporator shells are best seen in Figures 3, 4 and 5 from which it will be observed that the inner shell 20 is entirely flat, while the outer shell 21 is provided with various embossments such as 22 defining with the inner shell various circulatory ducts for refrigerant. The shell 20 is illustrated as being provided with upturned side margins 23 and upturned end margins 24. Brazing material indicated at 25 is sandwiched between the sheets and may have the form illustrated in my application for patent, Serial No. 395,894, entitled "Method of Brazing," filed of even date herewith.

For supporting the evaporator shells against undue deformation during the heating operation, an openwork bottom rack 27 is provided which is of minimum closed, or solid area for most effective heating of the evaporator shells. The rack 27 is illustrated as comprising a plurality of spaced longitudinally extending rods 28, 29, 30 and 31 contacting narrow longitudinal strips of the undersurface of the shell 20. These rods are made of minimum cross section consistent with their purpose and may be of 5/16 inch diameter and made of a heat-resisting alloy for the temperature of the brazing operation, which may be 2050° F. for the illustrated embodiment. The assembly is, however, sufficiently flexible to accommodate slight deflection of the portions of the rods between adjacent support rollers 13 for a purpose to be hereinafter described. As seen in Figures 3 and 4, the rods 28–31 have upturned end portions 28a, 29a, 30a, 31a which are connected by cross pieces 33 and 34. Also the two center rods 29 and 30 have U-shaped bends 29b and 30b by means of which the center rods are welded to the respective outer rods 28 and 31. Further, the center rods are joined by means of rods 35 and 36, Figure 3.

It has been found that, as the rack 27 travels over the rollers, the rollers exert an upward force on a limited increment of the rack 27 to produce what may be termed an ironing effect which tends to close any gaps between the outer and inner shells of the evaporator. The line contact of the rollers 13 with the rack 27 in conjunction with the flexibility of the rack serves to transmit the upward force of the rollers to the lower shell of the evaporator.

The effect may be caused by a slight sagging or downward deflection of the rack 27 between adjacent rollers. Thus, as a particular portion of the rack travels over the roller it would tend to move upwardly slightly and tend to act against the inertia of the upper shell of the evaporator to urge the shells together at the line of contact. It has been found that the exerting of the upward force by the rollers 13 on progressive portions of the flexible rack 27 serves to close any gaps between the shells of the evaporator to enhance the capillary attraction for the molten brazing material and thus to produce a uniform and complete brazing.

It has been further found that this ironing action is further enhanced by exerting a downward force on the upper shell of the evaporator at spaced transverse portions thereof. In the illustrated embodiment, this is accomplished by means of an upper rack 40 having side frame members 41 and 42 resting on the longitudinal margins 21a of the outer shell 21. Spanning between the side bars 41 and 42 are transverse pressure bars 44 which rest on the upper surfaces of the embossments such as 22 and have slots 44a at each end for accommodating interlocking of the cross bars 44 in the slots 41a and 42a of the side bars 41 and 42. It will be seen from Figure 4, that the longitudinal side bars 41 and 42 have notches such as 41b at their ends for accommodating the end flanges 24 of the lower shell 20. The rack 40 simply rests on the upper shell 21 and requires no fastening elements or the like, and is readily disassembled into its component parts.

It has been found that the cross bars 44 tend to enhance the ironing action as the bars 44 travel over the various rollers 13. This can be understood on the theory that the weight of the bars 44 tends to increase the slight deflection of the rack 27 and to increase the inertial resistance of the upper shell to the upward force exerted by the rollers to further tend to close any gaps between the upper and lower shells during the brazing operation. It will be understood that the side rails 41 and 42 and the cross members 44 are also of heat resisting alloy for the temperature of the brazing operation.

It has been found that a relatively light weight brazing fixture is adequate to fully accomplish the purposes of the present invention, and for example, the weight of the top rack assembly may be 21 pounds, and the weight of the bottom rack assembly may be 5 pounds, the total weight being 38 pounds including the work.

By virtue of the openwork light weight construction of the brazing fixture including the upper and lower rack assemblies 27 and 40, it has been found that in the illustrated embodiment a 38% increase in the number of units brazed in a given time is realized, the work being heated to the same temperature in travel through the heating chamber. Also a more complete and uniform brazing is achieved by virtue of the ironing action heretofore described.

It will be understood that variations and modifications may be effected without departing from the scope of the novel concepts of the present invention.

I claim as my invention:

1. The method of making a refrigerator evaporator which comprises superimposing an inner shell of flat sheet metal and an outer shell of sheet metal having outwardly embossed portions and flat planar portions with a layer of brazing material between the shells to form an assembly, moving said assembly into a heating chamber, applying downward forces on spaced transversely disposed portions of the outer shell by means of individual separately and independently movable transversely disposed weights resting on the outer shell to press the flat planar portions of the outer shell toward mating portions of the inner shell while providing freedom for relative expansion and deflection of all portions of the shells during heating thereof, applying upward forces on the assembly along transversely extending lines of deflection which are substantially spaced to provide downward deflection of the assembly between successive lines of deflection upon heating thereof in said heating chamber, and moving the assembly relative to the lines of deflection while the assembly is in heated condition to cause successive portions of the inner shell to be moved upwardly at said lines of deflection while the inertia of said outer shell and the weights tends to maintain mating portions of the outer shell at their previous positions to provide an ironing action progressively along the length of said inner shell tending to close any gaps between mating portions of the inner and outer shells.

2. The method of making a refrigerator evaporator which comprises superimposing an inner shell of flat sheet metal and an outer shell of sheet metal having outwardly embossed portions and flat planar portions with a layer of brazing material between the shells to form an assembly, supporting said inner shell from beneath by means of a metal support which is flexible at an operating temperature along lines of support extending generally longitudinally of the assembly and over areas narrow in comparison to the spacing between said lines of support, moving said assembly longitudinally in a heating chamber maintained at the operating temperature and with the assembly and the metal support in a heated relatively flexible condition supporting said support along transverse lines of deflection which extend across said assembly by means of supporting forces which are exerted on the assembly through said support at points where said transverse lines of deflection intersect said lines of support of said inner shell which extend generally longitudinally of the assembly to provide an ironing action progressively along the length of said inner shell, and applying downward forces solely as a result of readily deflectible bodies of low mass engaging the top portions of the embossments of the outer shell along spaced transversely extending lines and over areas narrow in comparison to the longitudinal spacing between transversely extending lines to tend to close any gaps between the flat planar portions of the outer shell and mating portions of the inner shell in conjunction with said ironing action.

References Cited in the file of this patent

UNITED STATES PATENTS

| Number | Name | Date |
|---|---|---|
| 620,133 | Horgan | Feb. 28, 1899 |
| 811,954 | Richardson | Feb. 6, 1906 |
| 995,589 | Eichmann | June 20, 1911 |
| 1,659,550 | Steenstrup | Feb. 14, 1928 |
| 1,764,271 | Leonard | June 17, 1930 |
| 1,992,467 | Blythe | Feb. 26, 1935 |
| 2,056,510 | Fallon | Oct. 6, 1936 |
| 2,061,850 | Roberts | Nov. 24, 1936 |
| 2,093,814 | Mann | Sept. 21, 1937 |
| 2,195,314 | Lincoln | Mar. 26, 1940 |
| 2,227,295 | Cope | Dec. 31, 1940 |
| 2,248,801 | Bernt | July 8, 1941 |
| 2,464,574 | Hengstler | Mar. 15, 1949 |
| 2,514,469 | Burkhardt | July 11, 1950 |
| 2,573,594 | Nofzinger | Oct. 30, 1951 |
| 2,614,517 | Peterson | Oct. 21, 1952 |
| 2,627,010 | Matteson | Jan. 23, 1953 |